UNITED STATES PATENT OFFICE 2,206,773

PRODUCTION OF CATALYTIC SEPTA

William J. Hale, Midland, Mich.

No Drawing. Original application June 13, 1936, Serial No. 85,182. Divided and this application October 7, 1936, Serial No. 104,553. Renewed November 13, 1939

8 Claims. (Cl. 23—233)

The present invention relates to the production of composite catalysts and more particularly to the production of a catalytic mass containing hydrative and dehydrogenative catalysts, and is a division of my prior application Serial No. 85,182, filed June 13, 1936.

In certain reactions, such for example as the production of organic acids from their corresponding alcohols or aldehydes by alternate dehydrogenation and hydration, special composite catalysts are desirable. As explained in my prior applications Ser. Nos. 571,281 and 574,033, organic acids may be produced from their corresponding alcohols or aldehydes by reacting the alcohol or aldehyde, in the presence of water, in vapor phase, with a catalytic mass including a dehydrogenative catalyst and a specially selected hydrative catalyst. In these circumstances the dehydrogenative catalyst functions to dehydrogenate the alcohol to the corresponding aldehyde and the hydrative catalyst functions to hydrate the aldehyde to an aldehydrol; the dehydrogenative catalyst then functions to effect the dehydrogenation of the aldehydrol, under the conditions of operation, to the corresponding acid.

The present invention relates to the types of composite catalysts described in the application referred to but deals particularly with the production of these by novel methods to produce more effective catalytic action.

As indicated in the applications referred to, the typical dehydrogenative catalysts which are employable are copper, silver, gold, zinc, cobalt, nickel, palladium and the platinum metals. Similarly, a relatively wide range of hydrative catalysts may be utilized in this type of process or any analogous process which involves the alternate or simultaneous action of dehydrogenative and hydrative catalysts.

The directive catalytic base employed in the process is a compound capable of uniting with the aldehydrol as it is produced. It is found that chiefly organic acid salts of those bases, which salts undergo appreciable hydrolysis at the temperature of the reaction, fulfill this requirement. The hydroxides of such metals, except possibly magnesium, are characterized as amphoteric electrolytes. Such metals are copper, beryllium, magnesium, zinc, aluminum, gallium, lanthanum and the yttrium metals, zirconium, cerium and the cerium metals, chromium, uranium, manganese, iron, cobalt and nickel. Additional strictly hydrative catalysts may be used in conjunction with these directive hydrative catalysts, such for example as the oxides of tungsten, vanadium, thorium, titanium and molybdenum.

It has been found in operating processes such as those described in the copending application referred to that the particular physical condition and area or surface of reaction of the catalyst is particularly important and furthermore the heat conductivity of the catalytic mass is likewise of salient importance.

Furthermore, in view of the fact that this type of reaction involves the production of free hydrogen, the withdrawal of this from the reaction zone is an important condition of the process. I have now found that processes of the character described in my prior applications can be considerably improved by producing the catalyst in preferred physical form.

In one phase of the invention an intimate, highly conductive mixture of unsintered activated dehydrogenative catalyst and hydrative catalyst is produced by fusing a reducible salt of the metal which ultimately is to act as the dehydrogenative catalyst in contact and admixture with a fusible or infusible salt of a metal whose oxide is to function in the process as the directive catalyst.

In operating the type of process herein referred to, it has been found that the catalytic mass is unsuited to continuous action of dehydrogenation and hydration if such mass is in sintered or intumescent form. A completely rigid state is most effective for the purpose at hand. Thus a catalyst prepared from a molten mass offers the best surface. Furthermore the action of copper or other dehydrogenative metal produced from the molten condition serves admirably for heat conductance as these metallic particles lie close together and thus afford enhanced control of temperature.

It has been suggested heretofore to first reduce to the molten condition the catalyst which is to be employed or to fuse a compound of the catalyst and then reduce this compound. Thus in British Patent 19,249 of 1910 it is pointed out that hydrogenative catalysts, such as iron, cobalt and nickel, when heated to the molten condition, lose sulphur, arsenic, phosphorus and other deleterious substances. It is also here pointed out that a small percentage of difficultly reducible oxides act as the promoters for the hydrogenation. The metals mentioned may be melted as such or in the form of their nitrates and other compounds which readily decompose into the metal at the higher temperatures employed.

Again British Patent 2,306 of 1914 describes the preparation of iron, cobalt, nickel or copper catalysts as hydrogenators and dehydrogenators of carbon compounds by incorporating with them traces of promoters, such as oxides or oxygen salts of an earthy metal inclusive of phosphates, molybdates, tungstates or selenates of alkaline earths. Good mixtures are effected by precipitation of hydroxides or carbonates from soluble salts of metals concerned or by fusion of mixtures of the nitrates of such metals.

In Berichte 42,2097 of 1909 and Berichte 43,3387 of 1910 Ipatiew points out that the activity of copper in metallic form as a reducing agent may be increased and made effective at lower temperatures by the use of iron and other promoters, and that a mixed metallic nickel-alumina catalyst was effective in bringing out the hydrogenation and dehydrogenation of phenol into cyclohexane at temperatures more than 100° lower than could be achieved by nickel alone, followed by treatment with aluminum oxide.

In British Patent 11,816 of 1886 the preparation of copper oxide as a catalyst by the action of oxygen on the molten metal is described.

Again in British Patent 147,958 of 1919 a process is described in which air is blown through refined molten copper to produce a liquid cuprous oxide which is then cooled, producing a catalyst of unusual purity.

Again British Patent 166,249 of 1920 describes a method of producing an oxide catalyst by melting cupric oxide, such cupric oxide became purified and was utilized in the dehydrogenation of different products.

Again it has been found in the past, as described in the U. S. patent to Bosch 1,148,570, that the catalytic efficiency of iron, for the hydrogenation of nitrogen (in the synthesis of ammonia) can be increased by bringing together a compound of iron, such as the oxide, in molten condition in the presence of various promoters and reducing the iron oxide to the metallic state in which the promoters are evenly distributed. It is there pointed out that operation at high temperature is disadvantageous, tending to diminish the efficiency of the catalyst; to avoid this difficulty the promoters were employed to reduce the operating temperature.

In the present state of the art it becomes necessary to secure a dehydrogenative catalyst of great purity, high density and of marked porosity, and at the same time to intimately associate it with the particular amphoteric electrolytes which function as directive catalysts.

It has now been found that copper and other hydrogenative and dehydrogenative metals may be promoted by the incorporation of a suitable catalyst therein. Thus silver and copper, which are effective dehydrogenative metals, are, according to the present process, brought into close relationship with hydrative catalysts by first melting the copper or equivalent metal and some salt of the catalyst required, which latter can ultimately be converted to its corresponding oxide. In producing the ultimate composite catalyst the dehydrogenative metal is reduced to the metallic state. Thus particularly effective catalysts can be produced by utilizing silver or copper, or a mixture of silver and copper, with an oxide hydrative catalyst, such as zinc oxide, magnesium oxide and the like.

In another phase of the invention it has been found effective to melt an alloy of the metals concerned and to allow these molten metals to drop through an atmosphere of hydrogen sulphide or oxygen. Thus an alloy of copper and zinc containing say about 20% of zinc may be melted in a current of air or oxygen and the molten mass collected on an asbestos plate. This mass may subsequently be broken into pieces and reduced in a current of hydrogen. The metallic copper is now present in even admixture with zinc oxide and some metallic zinc and provides an ideal catalyst for the type of process herein described. It is also to be noted, as pointed out by Hugh Taylor, that the efficiency of a dehydrogenative catalyst can markedly be improved by oxidation and reduction at successively lower temperatures. In the present instance it has been found that the copper, zinc oxide catalyst reoxidized at 350° C. and reduced to 300° C., and then again reoxidized at 300° C. and reduced at 250° C., may be brought into excellent condition to function effectively at reactions operating as low as 200° C.

When an alloy of copper and zinc is melted, as described above, and dropped into a vessel supplied with a current of hydrogen sulphide, the molten cuprous sulphide collects with an even distribution of the zinc sulphide throughout the mass. When this molten mass is cooled, broken up and reduced with hydrogen, copper and zinc metals are produced; when these are oxidized in air or oxygen and again reduced by hydrogen, a product comprising copper metal and zinc oxide is obtained. This particular catalyst is characterized by a more porous condition than where molten copper oxide constituted the original matte of copper.

It will be appreciated from the description hereinbefore given that other salts of copper and zinc may be used; particularly valuable among these are the acetates of these metals. Thus a mixture of copper and zinc acetates may be melted under appropriate conditions so as to insure uniform distribution of the two components, and the cooled mass may be broken up and reduced with hydrogen. Thereafter the reduced mass is oxidized and again reduced to establish the copper, zinc oxide structure described.

Another method which has been found effective is the distillation of say the copper metal into a vessel in which the other metal or metals concerned is likewise distilled. The boiling point of copper is about 2300° C. so that at this temperature any of the metals or oxides concerned can be brought over into the same vessel. The final mass is reoxidized at a lower temperature and again reduced prior to use in the operation. Extreme purity of the copper metal is hereby insured.

It is particularly to be observed that the secondary component or the hydrative, that is, directive catalyst, which is employed in the ultimate composite catalyst, does not need to be brought into the molten state during the preparation. The principal requirement is only that it be evenly distributed throughout the copper or other dehydrogenative metal frame work. Hence zinc oxide may be added to molten copper alone and this affords a good catalytic mass for the purposes of the present invention when it is oxidized and further reduced by hydrogen. However, as will be appreciated, increased porosity of the ultimate catalyst is naturally insured when the dehydrogenative metals, such as copper, silver and the like, are present in the original mass in the form of oxide or other salt and are reduced back to metallic state before service.

The special physical condition of the ultimate catalyst, by reason of this porous form, not only increases the efficiency of the catalyst itself but imparts to it the potentiality of serving as a permeable membrane. So efficient is this structural porous frame of the metallic element concerned that a septum of the finished catalyst is found to serve admirably for the transpiration of the smaller molecules, notably hydrogen, from the vaporous mixture of the reaction components. Thus a thin walled, partially reduced cylinder of cast copper oxide and zinc oxide serves both as a catalyst and as a diffusion septum for hydrogen. The entire reaction was thus speeded up by reason of the removal of this one component, i. e. hydrogen, in the equilibrium system.

It will likewise be noted that the catalyst itself can be cased in a cylinder or other relatively massive element and used as such without disintegration or breaking up. In such a condition, as will be appreciated, it serves very effectively in thermal control.

In the past considerable difficulty has been encountered in efforts to secure a synthetic septum or membrane capable of permitting the selective transpiration of any component out of a mixture of vaporous or gaseous components. It would appear at first blush that there should be no difficulty in separating the small molecules of hydrogen from the more complex molecules of benzene. It has been found, however, that this is a difficult problem and not entirely practical. Warrick & Mack (J. Amer. Chem. Soc. 55, 1324 (1933)) report interesting observations on separating hydrogen from benzene through a sieve made by heating a very thin brass sheet in a vacuum at from 400° to 900° C. The vaporizing of the zinc metal leaves channels in the copper through which hydrogen could diffuse or transpire. However, difficulties were met in that the large benzene molecules tended to plug up the channels to prevent further transpiration of the hydrogen. Reheating the membrane to higher temperatures temporarily permitted further passage of the hydrogen.

It has been found that the known property of palladium can be efficiently employed in the present process to assist in the transmission of hydrogen through the membrane. Although there is a striking reaction of hydrogen at the surface of palladium, the transmission of hydrogen through the metal is slow unless the temperature is well elevated. However, marked advantages have been reported when a septum of palladium silver or palladium gold alloy is employed. Thus an alloy comprising 40% silver in palladium has been found to absorb four times as much hydrogen as pure palladium itself, and this paradoxically in view of the fact that silver itself does not absorb hydrogen. It is also reported that the transpiration of hydrogen by palladium is marked at about 240° C.

In the course of experimentation on the present process a palladium silver alloy was employed as a septum in a vessel containing mixed vapors of the present process (i. e., water, ethyl alcohol, acetaldehyde, acetic acid and hydrogen). It was found, however, that the transpiration of the hydrogen was very slow at the temperatures at which the reaction was carried out. However, it was found that when this palladium silver septum had previously been heated to a high temperature the transpiration of the hydrogen was considerably increased. This indicated a possible slight distillation of silver from the palladium alloy and the installation of capillary channels through which hydrogen could pass.

In further work it was found that zinc alloyed with palladium can be removed effectively and at a relatively low temperature when the alloy is heated in the vacuum. Thus operations carried out at 400° to 900° C. suffice for removal of the zinc from a membrane comprising a palladium zinc alloy. When the heating was carried out in a vacuum, the resulting septum was found capable of transmitting hydrogen at low temperatures. It was furthermore found that an effective copper septum may be prepared by heating a brass to an elevated temperature and in a vacuum. In this latter case, however, as was reported by Warrick & Mack, it was found that the larger molecules tended to clog up the channels and prevent further transpiration of the smaller hydrogen molecules. The palladium, however, is particularly free from this disadvantage and appears to possess an inherent attraction for the hydrogen above all other gases and pulls it along in the direction of the vacuum applied.

It is to be noted that for the removal of a volatile metal from an alloy of copper, palladium and the like, it is found advantageous to slowly heat the alloy for the reason that there is less disruptive action on the ultimate channels formed within the residual metal. Alloys of copper with zinc, cadmium or lead are readily deprived of the low melting point metal by continued heating at relatively low temperatures and alloys or amalgams of copper with mercury were deprived of the mercury at the lowest temperature of all, namely 357° C.

It is now found that if palladium is associated with copper, such as to serve as a coating or partial lining of the capillary walls or interstices, then hydrogen passes rapidly along such palladium surface, and especially under the effect of a vacuum. One effective method of achieving this, for example, comprises heating a cylinder of an alloy of copper, zinc and a little palladium slowly to between 400 to 900° C. Under these conditions most of the zinc is volatilized. The thus treated cylinder was then used to enclose the catalyst of the present process and a mixture of water and alcohol or aldehyde vapors passed through the cylinder and in contact with the catalyst at temperatures of the order of 300° C. By application of a vacuum outside of the walls of the cylinder, considerable hydrogen was withdrawn from within the chamber. Another method of procedure comprises utilizing a very high zinc content brass tube and after heating at temperatures sufficiently high to volatilize off most of the zinc the cylinder was soaked in palladious nitrate or other salt of palladium. After such saturation the cylinder was heated to drive off the decomposition products. It was found that the palladium thus formed on the surface of the interstices or channels serves effectively for removal of the hydrogen from the metallic reaction zone.

It will be appreciated that metals other than those mentioned may be used in conjunction with copper, or with silver, gold and other dehydrogenative metals, in forming the septum for the transpiration of hydrogen. Thus mixtures or alloys of copper with lower boiling point metals may be employed. When these are heated under the proper conditions to insure the volatilization or partial volatilization of the low boiling point metal, interstitial spaces or channels are set up within the copper mass, permitting the transpiration of the hydrogen. Thus alloys and mixtures of copper and lead, copper and zinc, copper and cadmium, copper and lithium, copper and mercury and the like may be utilized.

According to another method of procedure a metal septum, such for example as a copper septum, may be coated on the inside with the composite catalyst. Thus the molten catalytic mass hereinbefore described can be used to coat the interior of the septum and thus aid in the transpiration of hydrogen. It will be observed that the oxide component of the catalytic mass, such for example as the oxide which may be formed on the interior surface of the septum by oxidation of the traces of zinc present in the original brass tube, serves very effectively for retaining such interior surface of the tube clear and unplugged by the larger molecules of gases. This is effected by reason of the action of the oxide in making and remaking salts with the acetic or other acid during the process.

It is to be observed at this point that the catalysts provided for according to the present invention differ markedly from earlier suggestions, such for example as described in the Legg U. S. Patent 1,401,117. Such prior suggestions comprise the fusion of a mass of copper oxide and the subsequent cooling and breaking up of the oxide mass. This oxide as such or the copper oxide reduced to some degree by hydrogen was employed as a catalyst. The catalyst of the present process in the first place is a composite and double functioning catalyst effecting both hydration and dehydrogenation. Furthermore, according to the present process the ultimate dehydrogenative and hydrative components of the final catalyst are intimately dispersed by reason of fusion of one or both of the starting materials from which the ultimate catalysts are formed.

The activity of the hydrative components of the composite catalyst may further be accentuated by subjecting the catalyst to the action of actinic rays in the manner fully described in my copending application Serial No. 748,928, filed October 18, 1934.

The utility of the several types of composite catalysts described herein is shown in the following examples:

Example I—A

A quantity of silver, admixed with approximately 15% of its weight of zinc oxide and about 1% of its weight of thorium oxide, was fused in an atmosphere of oxygen. After cooling the mass was broken up and 100 grams placed within an ordinary combustion tube and heated to 300° C. A stream of hydrogen was then passed through the tube until the reduction of the silver oxide was complete. Into the tube was now passed the mixed vapors of 46 grams (1 mol) of ethyl alcohol and 36 grams (2 mols) of water during a period of one hour. During this passage the temperature was maintained at between 270° C. and 280° C. The effluent from the tube was condensed and upon analysis was found to contain 39.6 grams of acetic acid, 14.9 grams of acetaldehyde and some water. Some hydrogen was evolved and liberated during the reaction but no other products were formed. The quantity of acid here recovered represents a 66% conversion of the alcohol to acid.

Example I—B

Example I—A was repeated in all details except that copper was employed in place of silver. It was found on analysis of the condensate that the yield was about identical with that of Example I—A.

Example I—C

Example I—A was again repeated in all details except that about one-half of the silver was replaced with copper. Here again the yield was substantially the same as in Example I—A.

Example II—A

A definite weight of copper containing approximately 15% of zinc (i. e. brass) was melted in an atmosphere of oxygen. The mass was then cooled and broken up. 100 grams of the broken mass was then placed in a combustion tube and reduced with hydrogen at 300° C. Oxygen was admitted to the tube at 270° C. and the thus oxidized mass reduced with hydrogen at a temperature of 225° C.

There was then passed over this catalyst a mixture of vapors of 46 grams (1 mol) of ethyl alcohol and 36 grams (2 mols) of water for a period of one hour while maintained at a temperature of about 235° C. in the reaction zone. The effluent vapors were condensed and upon analysis were found to contain 35.4 grams of acetic acid and a few grams of acetaldehyde. This yield, in a single pass, represents 59% conversion of alcohol to acid. There was total absence of carbon oxides and carbon unsaturates.

Example II—B

Into a combustion tube containing the catalyst described in Example II—A was introduced a thimble of high zinc brass which had been heated in a vacuum to drive off most of the zinc. This thimble was closed at one end and was connected at the other end to a vacuum pump. During the treatment considerable hydrogen and a trace of water and aldehyde was removed through the thimble.

Into the combustion tube were passed the mixed vapors of 46 grams (1 mol) of ethyl alcohol and 54 grams (3 mols) of water for a period of one hour and at a temperature of approximately 270° C. The condensed effluent vapors upon analysis were found to contain 59.8 grams of acetic acid and no aldehyde, thus representing practically a quantitative conversion. During the process traces of aldehyde and water were condensed from the effluent hydrogen vapors issuing through the vacuum pump.

Example III

A catalyst was prepared by heating to the boiling point a mixture of copper and about 15% of its weight of zinc. The distilled vapors were collected, cooled and broken up. 100 grams of the broken mass were placed in a combustion tube, oxidized with a stream of oxygen and then reduced with hydrogen at 300° C. The mass was reoxidized and again reduced at 270° C.

Through the combustion tube was then passed a vaporous mixture of 46 grams (1 mol) of ethyl alcohol and 36 grams (2 mols) of water over a period of one hour and at a temperature of approximately 270° C. The condensate showed on analysis 41.5 grams of acetic acid and a few grams of acetaldehyde, representing 69.2% conversion of alcohol to acid. By repeating this experiment under withdrawal of hydrogen by means of a porous thimble, as heretofore described, the yield was easily raised to 96%.

Example IV

Cuprous sulphide containing 15% of its weight of zinc sulphide was heated to the melting point, cooled and broken up. 100 grams of the mass was then placed in a combustion tube and reduced with hydrogen at from 300 to 350° C. The reduced mass was then oxidized and again reduced with hydrogen at approximately 300° C.

Through the tube was passed the mixed vapors of 46 grams (1 mol) of ethyl alcohol and 54 grams (3 mols) of water for a period of one hour and at a temperature of approximately 280° C. Upon analysis the condensate was found to contain 40.4 grams of acetic acid and a few grams of acetaldehyde, thus representing a conversion of 67.3%. By repeating this experiment under withdrawal of hydrogen by means of a porous thimble, as heretofore described, the yield was easily raised to 95% of the theoretical.

*Example V*

A catalyst as prepared in Example IV was placed in a combustion tube and there was passed through the tube the mixed vapors of 60 grams (1 mol) of N-propyl alcohol and 54 grams (3 mols) of water for a period of one hour and at a temperature of approximately 270° C. Upon analysis the condensate was found to contain 54 grams of N-propionic acid and several grams of propionic aldehyde, thus representing a conversion of 73% of the alcohol. By repeating this experiment under withdrawal of hydrogen by means of a porous thimble, as heretofore described, the yield was easily raised to 98% of the theoretically possible propionic acid derivable from N-propyl alcohol.

It will be appreciated that in actual operations the aldehydic fraction may be recycled with increased yield of acid.

It is to be observed that the process described herein is operable with a wide range of starting materials. Thus organic acids may be produced from their corresponding aldehydes by utilizing a relatively concentrated alcohol and reacting this with given quantities of water. Again, if desired, the process may be effectively carried out by using, as a starting material, the distillate of weak aqueous alcohols, such as beer and the like, produced by typical fermentation methods.

While preferred embodiments of the invention have been described, it is to be understood that these are given for the purpose of illustrating the principles involved and not as restricting the invention to the particular methods or materials described.

I claim:

1. A method of producing catalytically active septa which are permeable to hydrogen which comprises heating a septum of an alloy, the higher melting component of which is catalytically active, under conditions regulated to drive off the lower boiling metal component to establish channels or interstices in the residual metal, and then establishing a quantity of palladium on the surface of such channels.

2. A method of producing catalytically active septa which are permeable to hydrogen which comprises heating a septum of an alloy, the higher melting point component of which is catalytically active, under conditions regulated to drive off the lower boiling point components and to establish channels or interstices in the residual metal, and depositing a quantity of palladium on the surface of such channels or interstices.

3. A method of producing catalytically active hydrogen permeable septa which comprises forming a septum of an alloy of palladium, a dehydrogenative catalyst metal and a relatively low boiling point metal, heating the septum under conditions controlled to volatilize the lower boiling point metal and to establish channels or interstices throughout the residual metal structure.

4. A method of producing catalytically active hydrogen permeable septa which comprises forming a septum of an alloy of copper, zinc and palladium; heating the septum under conditions controlled to volatilize and remove a substantial quantity of the zinc and to establish channels or interstices throughout the residual metal.

5. A method of producing catalytically active septa which are selectively permeable to hydrogen which comprises heating a septum of an alloy, the higher melting point component of which is catalytically active under conditions regulated to drive off the lower boiling point components and to establish channels or interstices in the residual metal, saturating the septum with a solution of a palladium salt and heat treating the septum to deposit palladium on the surfaces of such channels or interstices.

6. A method of producing metallic septa capable of selectively permitting the transpiration of hydrogen forming a reaction zone containing hydrogen, alcoholic and acidic vapors which comprises forming a thin-walled septum of a polynary alloy containing palladium and zinc; heating the septum under conditions controlled to volatilize and remove a substantial quantity of the zinc and to establish channels or interstices throughout the residual metal.

7. A method of producing catalytically active, hydrogen permeable septa which comprises forming a septum of copper, palladium and a metal chosen from the group consisting of zinc, cadmium, lead, lithium and mercury; heating the septum under conditions controlled to volatilize and remove a substantial quantity of the lower boiling point metal and to establish channels or interstices throughout the residual metal.

8. A catalytically active septum selectively permeable to hydrogen which comprises a member consisting of an alloy of copper and palladium and which is penetrated throughout with minute channels or interstices capable of permitting the selective passage of hydrogen therethrough.

WILLIAM J. HALE.